US009438993B2

(12) United States Patent
Gärdenfors et al.

(10) Patent No.: US 9,438,993 B2
(45) Date of Patent: Sep. 6, 2016

(54) METHODS AND DEVICES TO GENERATE MULTIPLE-CHANNEL AUDIO RECORDINGS

(71) Applicant: BlackBerry Limited, Waterloo (CA)

(72) Inventors: Dan Zacharias Gärdenfors, Malmö (SE); Mathias Lewin, Rydebäck (SE)

(73) Assignee: BlackBerry Limited, Waterloo, Ontario (CA)

( * ) Notice: Subject to any disclaimer, the term of this patent is extended or adjusted under 35 U.S.C. 154(b) by 289 days.

(21) Appl. No.: 13/790,685

(22) Filed: Mar. 8, 2013

(65) Prior Publication Data

US 2014/0254820 A1    Sep. 11, 2014

(51) Int. Cl.

| | | |
|---|---|---|
| *H04R 27/00* | (2006.01) | |
| *H04R 3/00* | (2006.01) | |
| *H04M 3/42* | (2006.01) | |
| *H04M 3/56* | (2006.01) | |
| *H04R 5/027* | (2006.01) | |
| *H04S 3/00* | (2006.01) | |

(52) U.S. Cl.
CPC .......... *H04R 3/005* (2013.01); *H04M 3/42221* (2013.01); *H04M 3/561* (2013.01); *H04R 5/027* (2013.01); *H04R 27/00* (2013.01); *H04R 2227/003* (2013.01); *H04R 2499/11* (2013.01); *H04S 3/00* (2013.01); *H04S 2400/15* (2013.01)

(58) Field of Classification Search
CPC .... H04R 3/12; H04R 2420/07; H04R 27/00; H04R 3/00; H04R 3/005; H04R 3/04; H04H 60/04; H04W 4/06
USPC ............ 381/80, 77, 119, 122, 98, 104–109; 455/3.01–3.06
See application file for complete search history.

(56) References Cited

U.S. PATENT DOCUMENTS

| | | | |
|---|---|---|---|
| 5,572,728 A | 11/1996 | Tada et al. | |
| 6,125,115 A | 9/2000 | Smits | |
| 7,343,210 B2 * | 3/2008 | DeVito | G11B 27/034 369/119 |
| 7,711,443 B1 * | 5/2010 | Sanders et al. | 700/94 |
| 7,747,338 B2 | 6/2010 | Korhonen | |
| 7,929,902 B1 | 4/2011 | Sanders et al. | |
| 8,189,807 B2 | 5/2012 | Cutler | |
| 2004/0263636 A1 | 12/2004 | Cutler et al. | |
| 2006/0075347 A1 | 4/2006 | Rehm | |

(Continued)

FOREIGN PATENT DOCUMENTS

| | | |
|---|---|---|
| EP | 1898346 | 3/2008 |
| WO | 2009/026347 | 2/2009 |

OTHER PUBLICATIONS

European Patent Office, "Extended European Search Report", issued in connection with EP patent application No. 13158317.1, mailed Aug. 1, 2013, (8 pages).

(Continued)

*Primary Examiner* — Rasha Al Aubaidi
(74) *Attorney, Agent, or Firm* — Fish & Richardson P.C.

(57) ABSTRACT

Methods and devices to generate a multiple-channel audio recording are disclosed. An example method includes initiating a registration of a first device in response to determining that the first device is in a physical location of an event, sending first registration information to register the first device for the event, recording first audio via the first device, and sending the first audio for combination with second audio recorded via a second device.

17 Claims, 12 Drawing Sheets

(56) References Cited

U.S. PATENT DOCUMENTS

2010/0008516 A1 1/2010 Ichikawa et al.
2011/0167357 A1* 7/2011 Benjamin et al. ............ 715/753
2012/0127263 A1 5/2012 Ogle et al.

OTHER PUBLICATIONS

Geoffrey Francis, "Up and Running: A Reaper User Guide v 4.26", Aug. 2012, (403 pages).

* cited by examiner

METHODS AND DEVICES TO GENERATE MULTIPLE-CHANNEL AUDIO RECORDINGS

FIELD OF THE DISCLOSURE

This disclosure relates generally to audio recording and, more particularly, to methods and devices to generate multiple-channel audio recordings.

BACKGROUND

Recording audio during meetings can often help retain useful information about the meeting. The audio may be used by meeting participants to recall what was discussed and/or may be shared with persons who were not participants to provide them with the information that occurred in the meeting. The audio quality of recordings can vary significantly depending on the proximity of the person to the recording device. As a result, important information can be difficult to discern from an audio recording when speakers are far from the recording devices or when multiple people are talking simultaneously on the recording.

DETAILED DESCRIPTION

Figure 1:
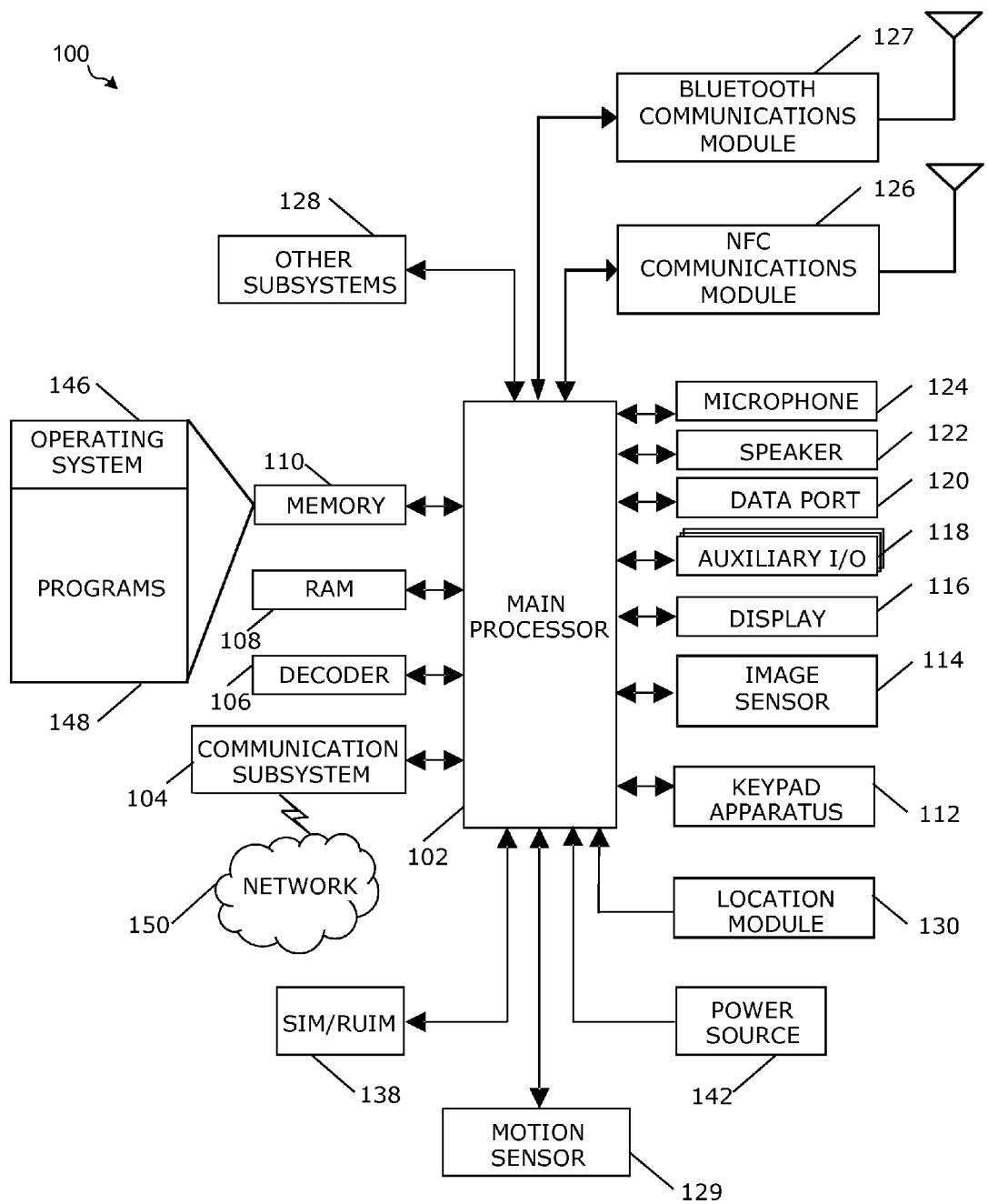
FIG. 1 is a block diagram of an example mobile device in accordance with the disclosure.

Systems and methods to record multiple-channel audio for an event are disclosed. Recording audio for events, such as meetings, can be useful for capturing and logging the content and contributions of participants in the meeting. In known systems, fixed multiple-microphone recording systems may be positioned in an event space to record audio within the event space. These multiple-microphone recording systems can be difficult to use and do not provide information regarding who is speaking at a particular time. Other known systems provide some persons at an event (e.g., singers at a concert) with a dedicated recording device. These systems suffer from requiring extensive configuration and may be limited in a number of recording devices that can be used, which limits the number of participants that can be captured. Both types of known systems further suffer from a lack of integration with auxiliary data related to the event, such as notes taken by participants at a meeting.

In contrast to known systems, example systems and methods disclosed herein register mobile devices associated with participants at an event and receive audio information from the registered devices. Such mobile devices need not be previously associated with each other or with a central service. The audio information received from the registered devices is combined to form a multiple-track or multiple-channel audio recording of the event. The combined audio recording may be further processed to integrate notes or other auxiliary information provided by the registered devices and/or from an administrator of the event into the combined audio. The auxiliary information may include any type of data related to the event, such as audio, time stamps, notes, photos, documents, video, and/or any other type of data. In some examples, the audio is then linked to the auxiliary data, which may be continuously time-stamped to map the auxiliary data to particular times during the event.

In some examples, an interactive visualization of the audio recording may be generated and provided in conjunction with the audio recording. The interactive visualization may be presented via a mobile device or other user interface to facilitate ease of reviewing the event. For example, the interactive visualization may provide a user with an easy way to identify which event participant(s) are speaking at a particular time, which event participant(s) are inactive at a particular time, and/or which event participant(s) have contributed particular auxiliary information. In an example of a conference event, the interactive visualization may show which presentation slide was shown at a particular time during the conference, the time(s) at which words and/or phrases were recorded in a note app during the event, the file or document that was visible to the conference participants at particular times, and/or any other type of auxiliary data that provides context to the record of the conference.

The example multiple-channel audio recording may also be processed to determine relative locations of persons at the event. In some examples, audio processing is performed with the assumption that a mobile device is located closer to the user of the device than to any other persons that may be present in the same event space as the device.

To combine the multiple channels of audio from the mobile devices, the event server collecting the audio provides synchronization information to the mobile devices to enable the event server to synchronize or correlate the recorded audio from multiple devices. As used herein, multiple-channel (or multiple-track) audio or a multiple-channel (or multiple-track) audio recording refers to audio in which multiple audio sources are distinguishable. Any of the individual channels may be individually suppressed (e.g., muted) while playing back any or all of the other channels. The multiple channels may be maintained as separate data streams and/or may be combined into a common data stream from which any channel or combination of channels may be filtered.

Events may be pre-generated or pre-registered with the event server by an administrator, presenter, and/or participant of the event. In some other examples, events are automatically generated by a server that manages event information. For example, a central calendar management server of an organization may monitor the events on users' calendars and provide the event server with notifications of events. In still some other examples, the event server may generate events upon registration of multiple mobile devices to the event, without advance notice of the event.

In some examples, the event is a meeting including multiple users physically located in an event space (e.g., a conference room). In some such examples, one or more participants in the event may be located remote from the event space. In such examples, the example event server may combine the audio in real time for transmission to the local and/or remote participants to the event.

In some other examples, the event is a public event such as a concert, a sporting event, or another public event. Users of mobile devices that attend the event may opt to register for the event and to permit their device(s) to provide distinct audio channels. The audio provided by attendees may be advantageously used by owners or managers of the event to augment audio channels directly set up and collected by the event managers (e.g., to obtain enhanced audio from a crowd of event attendees that a typical microphone arrangement would not usually capture). In some examples, users may be compensated or otherwise provided with an incentive to provide audio.

In some other examples, the event is a spontaneous public or private event in which users of multiple devices may decide that multiple tracks of recorded audio for the event are desirable. For example, public safety personnel responding to an emergency or other situation may initiate an event to keep a full and complete recording of the response. By configuring the event with a server or with one of the participating mobile devices, multiple mobile devices may be registered to the spontaneous event and may provide independent audio channels for combination at the server or at a designated mobile device.

An example method includes initiating a registration of a first device in response to determining that the first device is in a physical location of an event, sending first registration information to register the first device for the event, recording first audio via the first device, and sending the first audio for combination with second audio recorded via a second device. In some examples, initiating the registration at the first device comprises at least one of scanning an image with an image sensor, identifying the event based on a schedule, executing a close-proximity communications transaction, executing a wireless communications transaction, detecting motion of the first device, detecting a physical location of the first device via a location module of the first device, detecting a physical location of the first device using an image sensor external to the first device, detecting a physical location of the first device using an audio sensor external to the first device, forming an ad hoc wireless network, transmitting an audio signal, or receiving an indication of registration via a user interface.

Some example methods further include sending at least one of an identification of the first device or an identification of a user associated with the first device. Some example methods further include receiving a multiple-channel audio recording including the first audio and the second audio. In some example methods, sending the first audio is performed in real-time. In some examples, sending the first audio is performed when the event has finished. Some example methods further include sending a timestamp to synchronize the first audio with the second audio. In some example methods, sending the first registration information comprises sending the first registration information to a server, and transmitting the first audio comprises transmitting the first audio to the server.

An example mobile device includes a processor, an audio recording device, and a memory. The example audio recording device records first audio of an event. The example memory stores instructions which, when executed by the processor, cause the processor to: initiate a registration of a first device in response to determining that the first device is in a physical location of an event, send registration information to register the mobile device for the event, and send the first audio for combination with second audio of the event recorded via a second device.

In some examples, the mobile device further includes an image sensor and the instructions are to further cause the processor to initiate the registration in response to scanning an image with the image sensor. In some examples, the mobile device further includes a close-proximity communications subsystem and the instructions are to further cause the processor to initiate the registration in response to executing a close-proximity communications transaction with the close-proximity communications subsystem.

In some examples, the instructions are to cause the processor to initiate the registration in response to at least one of identifying the event based on a schedule, identifying a location of the mobile device, or forming an ad hoc wireless network. In some examples, the registration information comprises at least one of an identification of the mobile device or an identification of a person associated with the mobile device. In some example mobile devices, the instructions are further to cause the processor to send information to describe the event.

Another example method includes receiving registrations from a plurality of devices located at a physical event location, determining that the registrations correspond to a same event at the event location, receiving a plurality of audio channels from the plurality of devices, and combining the plurality of audio channels. In some examples, each of the registrations includes a same event identifier.

Some example methods further include assigning an identifier of a speaking person to an audio channel based on an identifier of a respective one of the devices that recorded the audio channel. In some such examples, a registration corresponding to the one of the devices includes at least one of an identifier of the device or an identifier of the speaking person. Some example methods further include distributing a combined audio recording to at least one of the plurality of devices. Some such example methods further include enhancing the combined audio recording to include auxiliary data representative of audio in the audio recording.

An example device includes a processor and a memory. The example memory stores instructions which, when executed by the processor, cause the processor to: receive registrations from a plurality of devices located at a physical event location, determine that the registrations correspond to a same event at the event location, receive a plurality of audio channels from the plurality of devices, and combine the plurality of audio channels. In some examples, each of the registrations includes a same event identifier. In some example devices, the instructions are to cause the processor to assign an identifier of a speaking person to an audio channel based on an identifier of a respective one of the devices that recorded the audio channel.

In some examples, one of the registrations corresponding to the one of the devices includes at least one of an identifier of the device or an identifier of the speaking person. In some example devices, the instructions are to cause the processor to distribute a combined audio recording to at least one of the plurality of devices.

A block diagram of an example mobile device 100 is shown in FIG. 1. The mobile device 100 includes multiple components, such as a processor 102 that controls the overall operation of the mobile device 100. Communication functions, including data and voice communications, are performed through a communication subsystem 104. Data received by the mobile device 100 is decompressed and decrypted by a decoder 106. The communication subsystem 104 receives messages from and sends messages to a wireless network 150. The wireless network 150 may include any type of wireless network, including, but not limited to, data wireless networks, voice wireless networks, and networks that support both voice and data communications. A power source 142, such as one or more rechargeable batteries or a port to an external power supply, powers the mobile device 100.

The processor 102 interacts with other components, such as Random Access Memory (RAM) 108, memory 110, a keypad apparatus 112, an image sensor (e.g., camera) 114, a display 116, an auxiliary input/output (I/O) subsystem 118, a data port 120, a speaker 122, and a microphone 124. The processor 102 also interacts with an NFC communications module 126 and a Bluetooth communications module 127, as well as other subsystems 128. The example processor 102 interacts with a motion sensor 129, such as a 3-axis accelerometer, to determine the physical orientation of the mobile device 102 and/or to detect movements (e.g., impacts, shaking, etc.). The example processor 102 further interacts with a location module 130 and a touch-sensitive interface 132.

In one example, the processor 102 and the memory 110 may cooperate to implement the functionality described herein. For example, tangible and/or non-transitory, and/or machine readable instructions may be stored by the processor 102 and/or the memory 110 to implement the functionality shown in FIG. 7.

Input via a graphical user interface is provided via the keypad apparatus 112 and/or the touch-sensitive interface 132 to the processor 102. Information, such as text, characters, symbols, images, icons, and other items that may be displayed or rendered on a mobile device, is displayed on the display 116. The example touch-sensitive interface 132 may be any type of interface capable of detecting user interactions with the display via touches, such as resistive, capacitive, surface acoustic wave, and/or any other past, present, or future type of touch-sensitive interface.

To identify a subscriber for network access, the mobile device 100 may utilize a Subscriber Identity Module or a Removable User Identity Module (SIM/RUIM) card 138 for communication with a network, such as the wireless network 150. Alternatively, user identification information may be programmed into memory 110.

The example location module 130 determines a location of the mobile device 100. For example, the location module 130 may be a global positioning system (GPS) module that determines the geographical position of the mobile device 100.

The mobile device 100 includes an operating system 146 and software programs, applications, or components 148 that are executed by the processor 102 and are typically stored in a persistent, updatable store such as the memory 110. Additional applications or programs may be loaded onto the mobile device 100 through the wireless network 150, the auxiliary I/O subsystem 118, the data port 120, the NFC communications module 126, the Bluetooth communications module 127, or any other suitable subsystem 128. For example, the mobile device 100 may store an accessory configuration file for each accessory with which the mobile device 100 has been paired or otherwise associated.

A received signal such as a text message, an e-mail message, or web page download is processed by the communication subsystem 104 and input to the processor 102. The processor 102 processes the received signal for output to the display 116 and/or to the auxiliary I/O subsystem 118. A subscriber may generate data items, for example e-mail messages, which may be transmitted over the wireless network 150 through the communication subsystem 104. For voice communications, the overall operation of the mobile device 100 is similar. The speaker 122 outputs audible information converted from electrical signals, and the microphone 124 converts audible information into electrical signals for processing. The example mobile device 100 of FIG. 1 may store the signals from the microphone 124 and/or synchronization information in the memory 110 for subsequent processing and/or transmission. The signals from the microphone 124 may be combined with audio from other devices to generate a multiple-track audio recording.

The example image sensor 114 may be used in conjunction with the processor 102 and the programs 148 to read computer-readable information. Examples of such information include quick-response (QR) codes, barcodes, and/or any other type of computer-readable image. In response to reading information via the image sensor 114, the example processor 102 may take an action based on instructions in the computer-readable information and/or a pre-programmed action based on data in the computer-readable information.

Figure 2:
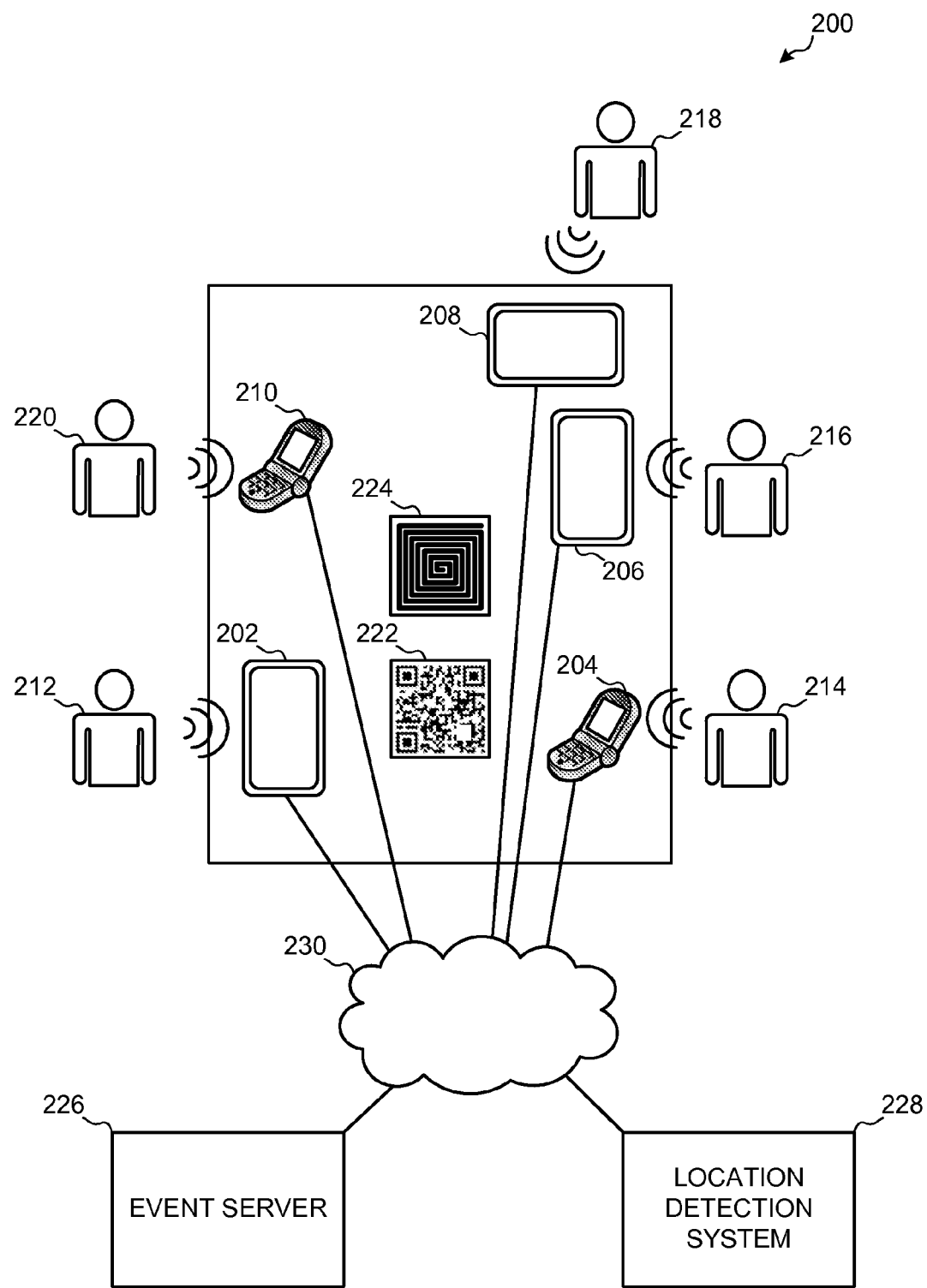
FIG. 2 illustrates an example environment in which multiple mobile devices may be used to record multiple channels of audio for an event in accordance with the disclosure.

FIG. 2 illustrates an example environment 200 in which multiple mobile devices 202-210 may be used to record multiple channels of audio for an event. The example environment 200 illustrated in FIG. 2 may be a conference room in which the event (e.g., a meeting) is to occur. Each of the example mobile devices 202-210 of FIG. 2 has a corresponding user 212-220 (e.g., owners of the mobile devices 202-210, persons to whom the mobile devices 202-210 have been assigned by an IT department, etc.).

The users 212-220 and the respective mobile devices 202-210 of FIG. 2 are positioned within the environment 200. In the example, the mobile devices 202-210 are located proximate to their respective users 212-220 (e.g., the mobile device 202 is located on a table in front of the user 212). As used herein, the term "proximate," as applied to the relationship between mobile devices and corresponding users, refers to physical relationships in which a microphone or other audio input of the mobile device may reliably capture audio originating from the user.

The example mobile devices 202-210 may be registered to the event in any of multiple ways. For example, the mobile devices 202-210 may be used to scan a barcode 222 (e.g., a quick-response (QR) code), which provides the mobile device 202-210 with registration information (e.g., an identification of the environment 200, an identification of the event, an address of a registration server, etc.). The mobile devices 202-210 may additionally or alternatively be tapped to a near-field communication (NFC) or other close-proximity communications tag 224. Like the barcode 222, the example NFC tag 224 provides a mobile device 202-210 with registration information when the mobile device 202-210 is tapped to the NFC tag 224. In some examples, the environment 200 includes multiple QR codes and/or NFC tags, where each QR code and/or NFC tag corresponds to a particular position within the environment. Thus, when scanning the example QR code 222 or NFC tag 224, an example device 202 is registered to the event and is associated with a position (e.g., a particular seat at a conference table). While example barcodes and tags are described in this example, any past, present, and/or future barcodes, tags, and/or other computer readable indicia may be used.

Additionally or alternatively, the example users 212-220 may manually provide registration information to their mobile devices 202-210 via user interfaces of the mobile devices 202-210. In some examples, the mobile devices 202-210 may obtain registration information via a calendar application, and electronic mail application, or another application that includes event information (e.g., a scheduled location of the event, scheduled participants, a scheduled time of the event, etc.). In some examples, mobile devices 202-210 may obtain registration information by bumping (e.g., making measurable direct or indirect contact with another device). Bumping devices may initiate an event for the bumped devices and/or may provide registration information for an existing event from a registered device to another device not yet registered.

In some examples, the mobile devices 202-210 recognize the presence of other ones of the mobile devices 202-210 (e.g., via a close-proximity communication, via an ad hoc WiFi network, via a Bluetooth or other radio frequency communication, via audio communications such as ultrasonic audio communications, through sharing of location information, or via any other method of detecting that other ones of the devices 202-210 are participating in the same event. In response to detecting other ones of the mobile devices 202-210, the example mobile devices 202-210 may exchange information to obtain registration information for the event.

Figure 3:
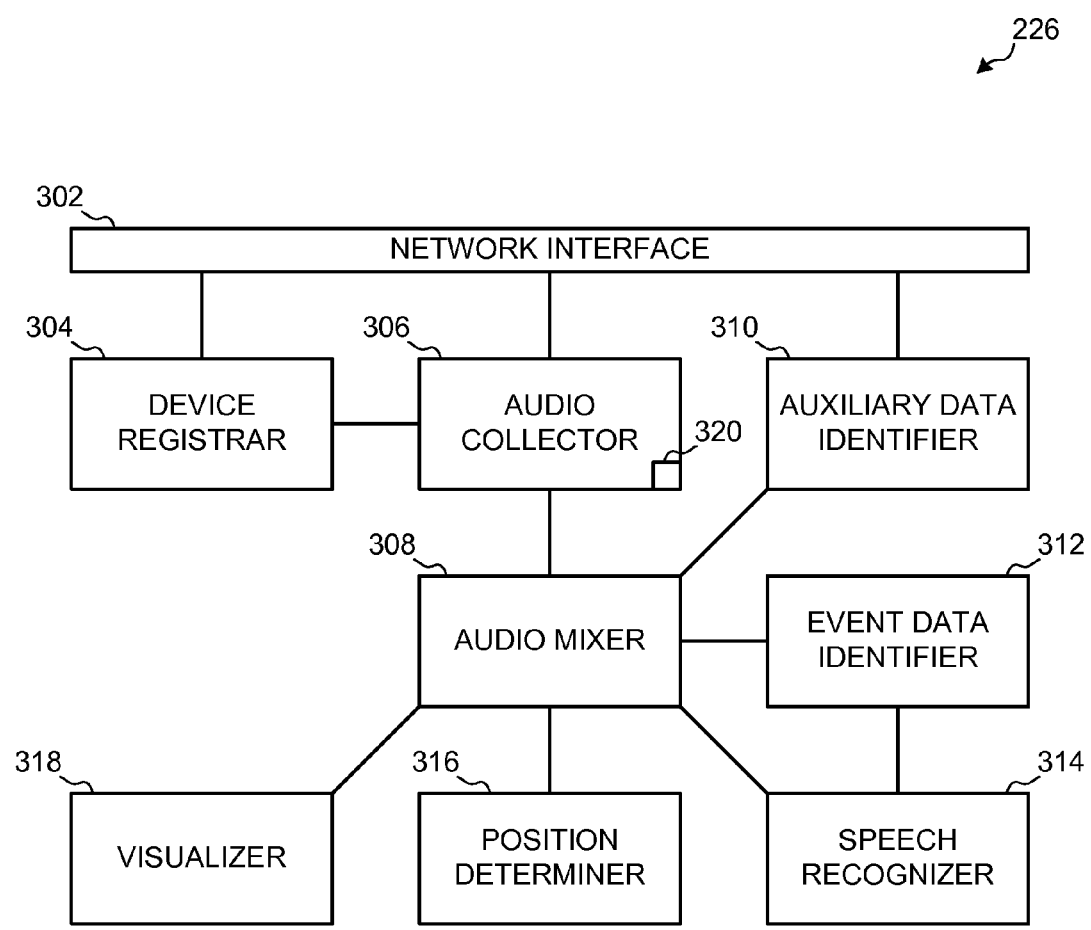
FIG. 3 is a more detailed block diagram of the example event server of FIG. 2.

Any or all of the example methods of obtaining registration information at the mobile devices 202-210 may cause the mobile devices 202-210 to initiate registration with, for example, an event server 226. Initiating registration may include prompting the users 212-220 to register their devices or otherwise enabling the mobile devices 202-210 to record audio and provide the recorded audio for combination. While the example event server 226 of FIGS. 2 and 3 is described as a standalone device, the event server 226 may alternatively be implemented using any of the mobile devices 202-210 participating in the event.

In some examples, the environment 200 includes a location detection system 228 communicatively coupled to the event server 226. The example location detection system 228 may include an image sensor combined with computer vision to detect the relative positions of the devices 202-210 and/or the participants 212-220 within the environment. The example location detection system 228 may further detect the addition of participants 212-220 and/or devices 202-210 to the environment. When a device or participant is detected by the example location detection system 228, the example location detection system 228 prompts the detected device (or a device associated with the detected person) to register for the event associated with the environment 200. If the detected device is to register, the device provides registration information to the example event server 226.

Upon receiving registration information, the example mobile devices 202-210 register with the event server 226 via the network 230. FIG. 3 is a more detailed block diagram of the example event server 226 of FIG. 2. The example event server 226 of FIG. 3 includes a network interface 302, a device registrar 304, an audio collector 306, an audio mixer 308, an auxiliary data identifier 310, an event data identifier 312, a speech recognizer 314, a position determiner 316, and a visualizer 318. The example network interface 302 includes the appropriate hardware, firmware, and/or software (e.g., an Ethernet interface, a wireless networking interface, etc.) to enable the event server 226 to communicate with the mobile devices 202-210 and any other devices via the network 230 of FIG. 2.

The example mobile devices 202-210 may access the event server 226 specified in registration information received by the mobile devices 202-210. For example, the event server 226 may be remote from the location of the event. To register, the example mobile device 202 of FIG. 2 provides an identifier of the mobile device 202, an identifier of the user of the mobile device 202, and/or an identifier of an event for which the mobile device 202 is to record and provide audio to the device registrar 304 (e.g., via the network interface 302). The other mobile devices 204-210 may provide corresponding information when registering. In some examples, one or more of the mobile devices 202 (e.g., the first mobile device 202 to register for the event) provides information to describe the event, such as the location, the time, the participants, an agenda, and/or any other event-specific information. The device registrar 304 uses the event information to create an event when an event does not yet exist. The information further enables the device registrar 304 to determine that the other mobile devices are registering for the event.

In some examples in which the device registrar 304 is not provided with event information prior to the event or prior to the registration, the example device registrar 304 creates the event and searches prior registrations for mobile devices 202-210 and/or subsequent registrations of mobile devices 202-210 to determine whether any mobile devices 202-210 that have not specified an event but have provided information describing the event (e.g., location, time, etc.). If any such mobile devices 202-210 are identified, the example device registrar 304 prompts those identified mobile devices 202-210 to confirm whether the identified mobile devices 202-210 are participating in the same event.

The example audio collector 306 collects audio from the mobile devices 202-210 for the event. In some examples, the event server 226 is to receive audio from multiple, concurrent events. The example audio collector 306 determines the event to which received audio information corresponds (e.g., based on an identity of the mobile device 202-210 providing the audio information). At a start time of the event, the example audio collector 306 provides synchronization information to the registered mobile devices 202-210. The mobile devices 202-210 use the synchronization information to label the audio information provided to the audio collector 306. In some examples, the audio collector 306 receives audio in real-time or near real-time and stores the received audio for later retrieval by the audio mixer 308. To this end, the example audio collector 306 may include a storage device 320.

In some examples, the synchronization information may include a common source of timekeeping to be used by the mobile devices 202-210 for the event. The example mobile devices 202-210 mark the beginning and/or the end of each transmitted block of audio with the timestamp. The example audio mixer 308 uses the timestamp to determine the correlate multiple channels of audio. For example, the audio mixer 308 may use the timestamp as a starting time of a block of audio, such that the audio runs from the starting time until the block of audio is finished, resulting in an end time for the block of audio. In some examples, the timestamp for a subsequent audio block for the same channel is substantially equal to end the time of the immediately prior block of audio when the audio channel is to be contiguous (e.g., when sequential periods of time include audio for a channel). In some examples, the audio mixer 308 assumes that gaps in the time line of a channel correspond to muted audio.

The example audio mixer 308 of FIG. 3 mixes or combines the audio collected via the audio collector 306 into a multiple-channel or multiple-track audio recording. The example audio mixer 308 combines the audio such that the audio tracks and/or audio signal(s) within the audio tracks may be individually emphasized and/or de-emphasized (e.g., muted) by a playback device. An audio track refers to a recording by a mobile device. An audio signal refers to a particular audio component (e.g., source of audio, audio frequency, etc.). A given audio track may include multiple audio signals, and an audio signal may be recorded as a part of multiple audio tracks. Additionally, the example audio mixer 308 of FIG. 3 inserts markers, metadata, and/or other auxiliary data corresponding to the audio recording. For example, the auxiliary data may include notes, comments, video, timestamp markers, copies of presentations, copies of agenda, and/or any other type of data collected by the mobile devices 202-210 during the event and/or otherwise associated with the event. The auxiliary data may be automatically detected and included in the audio recording and/or manually inserted via users generating markers via the devices 202-210.

In the example of FIG. 3, the audio mixer 308 analyzes the received audio tracks to identify the audio signals present in the audio tracks. For example, a first device 202 may pick up audio signals 1, 2, and 3, a second device 204 may pick up audio signals 2, 3, and 4, and a third device 206 may pick up audio signals 1, 4, and 5. The example audio signal 4 can then be isolated for listening by combining the tracks from devices 204, 206 (e.g., by comparing the similarities and differences between the tracks).

The example event data identifier 312 of FIG. 3 analyzes the combined audio generated by the audio mixer 308 and identifies notable events from the audio. For example, the event data identifier 312 may receive text information from the speech recognizer 314 and identify keywords based on inflection, repetition, excitement, and/or any other audible clues as to the importance of particular words. The example event data identifier 312 may additionally or alternatively note items of interest associated with the event, such as which slide in a deck of presentation slides is being shown during a particular portion of a meeting. The event data identifier 312 provides the identified notable events to the audio mixer 308, which inserts or integrates the notable events as tags, markers, or other types of annotations into the combined audio. The example notable events may later enable requests or queries of the audio recording such as: "Start playing back the audio at Song X."

The example speech recognizer 314 translates speech identifiable in the multiple-channel audio to text or other format. In the example of FIG. 3, the speech recognizer 314 uses multiple ones of the channels in the combined audio to improve speech recognition. In some examples, the speech recognizer 314 timestamps and inserts the translated speech into the audio channel with which the text is most closely related (e.g., the audio channel associated with an mobile device owned by the speaking person, the audio channel associated with a mobile device from which the speech was most clearly audible, etc.). In some examples, the speech recognizer 314 uses speaker-dependent training data provided by the device 202-210 associated with the speaker. In some examples, the speech recognizer 314 is implemented at each of the devices 202-210, and the resulting translated speech (and corresponding timestamps) is received at the event server 226 for processing and/or inclusion in the multiple-channel audio recording.

The example speech recognizer 314 and/or the event data identifier 312 of FIG. 3 may further analyze the speech in multiple ones of the channels to infer additional information about the speech. For example, when two (or more) channels take turns alternating speech and silence, the example speech recognizer 314 and/or the event data identifier 312 may infer that the persons associated with the channels or mobile devices 202-210 are engaged in a conversation with each other and that everyone else at the event is listening (e.g., idle) during that time period. In another example, the speech recognizer 314 and/or the event data identifier 312 determine voice inflection or other voice characteristics of a channel to identify questions, statements, emotion, and/or other voice qualities. In the case where a question is identified, subsequent statement(s) may be inferred to be response(s) to the question.

The example speech recognizer 314 and/or the event data identifier 312 may perform any other type of voice analysis to provide context to the conversation and/or to enable more specific queries of the content of the multiple-channel audio recording. For example, a user reviewing the audio recording may request specific information such as: "What did person (3) say in response to person (1) when viewing slide (3) of the presentation?" (e.g., to obtain a response by person (3) to a question posed by person (1) during a time period that slide (3) is shown), "Give me the optimized audio recording for participant (4) and filter out the others," (e.g., to listen to the channel for person (4), which may have reduced noise from processing with other channels) and/or "Give me participants (2) and (4) as text during slide (6)" (e.g., to obtain a transcript of the two channels while slide (6) is shown). Additionally or alternatively, the speech recognizer 314 and/or the event data identifier 312 may enable more general queries such as: "Who was the most active participant of the meeting?" Any other type of request based on the inferred information may be obtained during subsequent viewing by providing the appropriate markers and/or text information.

The example position determiner 316 of FIG. 3 determines relative positioning of the participants and/or the devices in the event based on the audio. For example, the position determiner 316 may triangulate the position of each mobile device 202-210 (and, thus, each corresponding user 212-220) based on the relative strengths of the each speaker's voice and the relative strengths of audio received by each mobile device 202-210. In some examples, the mobile devices 202-210 include multiple microphones that may be used to identify a direction from which audio originates. In combination with an identification of a mobile device associated with the speaker (e.g., the mobile device that receives the strongest signal for the audio), the position of an originator of audio may be identified with respect to each of the mobile devices 202-210.

The position determiner 316 may use additional or alternative factors to determine the relative positions of the devices 202-210, such as accelerometer and/or orientation data, compass data, network signal strength data, and/or any other data available to the position determiner 316 (e.g., sensor data from the devices 202-210). In some other examples, the positions of the mobile devices 202-210 may be determined via explicit registrations (e.g., check-ins) to locations in the environment 200. An explicit registration of a position may be to one of multiple pre-determined positions (e.g., a predetermined arrangement of locations in the environment) and/or to a non-predetermined position.

The example visualizer 318 of FIG. 3 generates a visualization of the multiple-channel audio recording generated by the audio mixer 308. Visualizations of the audio channels provide visual information about the channels of audio. For example, the visualization may include multiple overlaid timelines representative of the audio channels. When a user reviews the visualization, any of the timelines may be selected to be hidden or shown to enable a user to review the audio channels associated with persons of interest. Example visualizations are shown in FIGS. 5A-5E.

Figure 4:
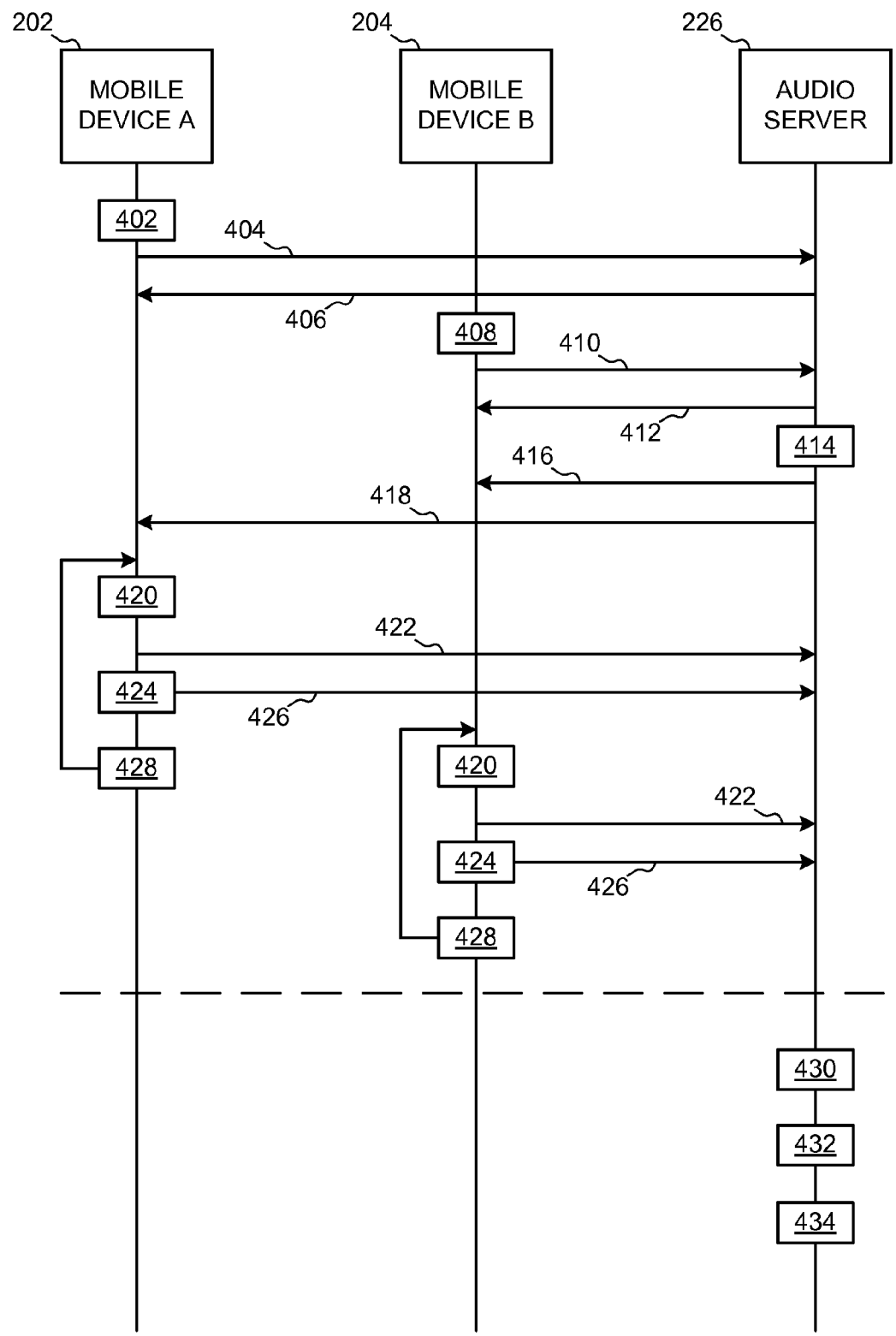
FIG. 4 illustrates example communication flows between multiple mobile devices at an event and a server to record multiple-channel audio for an event.

FIG. 4 illustrates example communication flows between multiple mobile devices (e.g., mobile devices 202, 204 of FIG. 2) at an event and an event server (e.g., the event server 226 of FIG. 2) to record multiple-channel audio for an event.

The example mobile device 202 initiates registration for an event (block 402). Initiating the registration 402 may include scanning an image with an image sensor (e.g., the image sensor 114 of FIG. 1), identifying the event based on a schedule (e.g., a scheduling application), executing a close-proximity communications transaction (e.g., via the NFC communications module 126, the Bluetooth communications module 127, and/or any other close-proximity communications device or module), executing a wireless communications transaction (e.g., a WiFi communications transaction, etc.), detecting a physical location of the first device via a location module of the first device (e.g., via the location module 130), detecting a physical location of the first device using an image sensor external to the device (e.g., the image sensor 114), detecting motion of the device (e.g., via the motion sensor 129 such as an accelerometer), detecting a physical location of the first device using an audio sensor external to the first device (e.g., via the microphone 124), or forming an ad hoc wireless network (e.g., with the mobile device 204), transmitting an audio signal (e.g., an ultrasonic audio signal via the speaker 122), and/or receiving an indication of registration via a user interface (e.g., the keypad apparatus 112, the display 116). In some examples, initiating the registration 402 includes obtaining the details of the event. The example mobile device 202 registers 404 for the event. In some examples, the registration includes an identification of the event for which the mobile device 202 is registering. The example event server 226 receives the registration and sends a confirmation reply 406.

At some later time, the mobile device 204 initiations registration for an event (e.g., the same event as the mobile device 202) (block 408). While the mobile device 204 has initiated registration for the same event as the mobile device 202, the mobile devices 202, 204 may not initially be aware that the other is registering for the same event. The example mobile device 204 registers 410 for the detected event. The example event server 226 receives the registration and sends a confirmation reply 412.

The example event server 226 determines that the registrations received from the mobile devices 202, 204 correspond to the same event (block 414). The event server 226 sends synchronization messages 416, 418 to the mobile devices 202, 204 belonging to the same event. The synchronization messages 416, 418 are used by the respective mobile devices 202, 204 to timestamp the audio captured by the mobile devices 202, 204 to enable the event server 226 to correlate audio recordings occurring simultaneously at the different mobile devices 202, 204.

When synchronized, the example mobile devices 202, 204 record audio (e.g., audio received via input devices such as the microphone 124 of FIG. 1) (block 420). The mobile devices 202, 204 transmit 422 the recorded audio to the event server 226. In the example of FIG. 4 the mobile devices 202, 204 transmit 422 the audio substantially immediately after capturing the audio (e.g., after recording, encoding, and/or packaging a block of audio for delivery to the event server 226). In some other examples, the audio is transmitted 422 to the event server 226 at completion of the event. However, audio may be transmitted to the event server 226 at any time after recording of the audio.

The example mobile devices 202, 204 determine whether a marker or other indicator (e.g., a marker or indicator of auxiliary information or metadata associated with the event) has been received (block 424). Example markers or indicators include annotations by users of the mobile devices 202, 204 and/or flags set by users of the mobile devices 202, 204 to, for example, mark the times of notable information or occurrences during the event. Any markers that are received (block 424) are transmitted 426 to the example event server 226 (e.g., as a part of the audio information transmitted to the server or separately from the audio information).

The mobile devices 202, 204 further determine whether the event is finished (block 428). The end of the event may be detected automatically (e.g., based on a scheduled time of the event) and/or in response to an input by the user. If the event is not completed (block 428), the mobile devices 202, 204 continue to record audio (block 420), receive markers (block 424), and transmit 422, 426 the audio and/or markers to the event server 226.

At some time, the mobile devices 202, 204 detect that the event is over (block 428). When the mobile devices 202, 204 complete the transfers of audio and/or markers to the event server 226, the example event server 226 mixes or combines the audio (block 430). In some examples, mixing or combining the audio includes comparing the timestamp information in the received audio to align the audio received from the multiple mobile devices 202, 204 and generating a multiple-channel or multiple-track audio recording from the aligned audio.

The example event server 226 processes the mixed audio (block 432). Processing may include generating a visualization, determining relative positions of the participants in the event space, generating a transcript by performing speech recognition, identifying markers and/or other notable occurrences in the event, and/or otherwise deriving additional information from the multiple-channel audio. The example event server 226 includes the information determined from the processing in a file or other data structure with the multiple-channel audio.

Figure 5A:
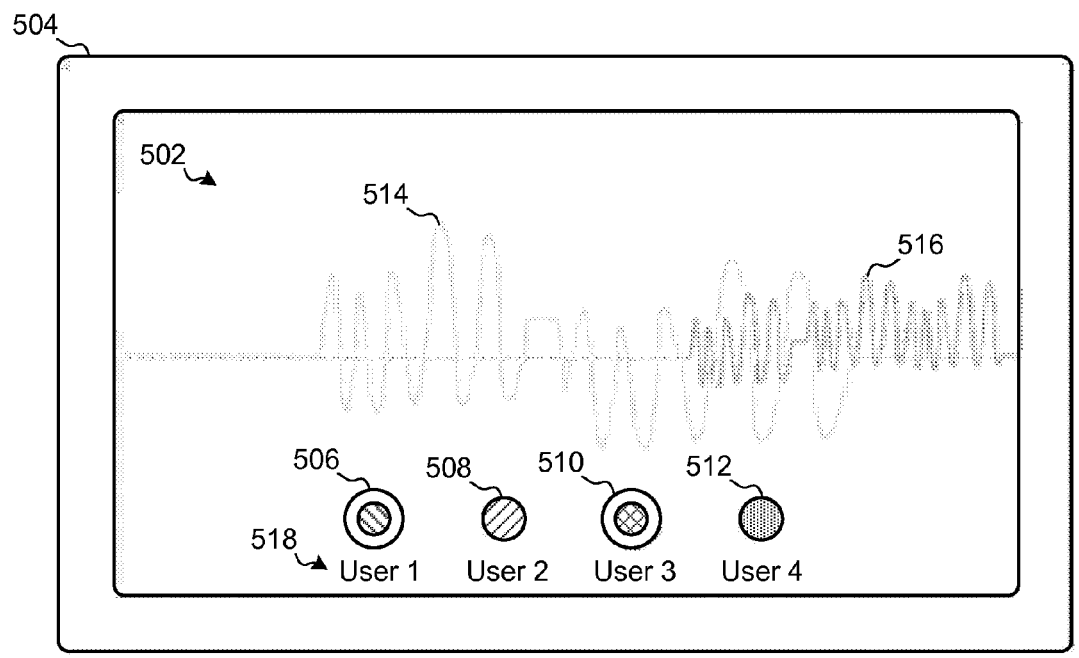
FIGS. 5A-5E illustrate example visualizations of a multiple-channel audio recording generated in accordance with the disclosure.

FIG. 5A illustrates an example visualization 502 to display multiple-channel audio. The example visualization 502 of FIG. 5A is shown on an example mobile device 504 (e.g., a tablet computer) having a touch interface. The example visualization 502 includes toggles 506-512 (e.g., software buttons that respond to a touch action). The toggles 506-512 correspond to audio tracks, such as example audio tracks 514 and 516, each of which represents audio captured from a mobile device participating in an event. The example audio track 514 corresponds to the example toggle 506 and the example audio track 516 corresponds to the example toggle 510.

The example toggles 506-512 of FIG. 5A may be selected or deselected to show or hide, respectively, a corresponding one of the audio tracks (e.g., the audio tracks 514, 516). Thus, in the illustrated example, the toggles 506, 510 are selected and the toggles 508, 512 are deselected. As a result, the audio tracks 514, 516 corresponding to the selected toggles 506, 510 are displayed and audio tracks corresponding to the deselected toggles 508, 512 are not displayed. In the example of FIG. 5A, selected toggles 506, 510 are displayed differently than the deselected toggles 508, 512. The example toggles 506-512 are also provided with identifications 518 (e.g., names) of users associated with the audio tracks corresponding to the toggles 506-512.

The example visualization 502 of FIG. 5A includes time as a horizontal axis. In some examples, the visualization 502 may be scrolled horizontally (e.g., to the left and/or right) to view other portions of the speech. Additionally or alternatively, the visualization 502 may be zoomed in or out to increase or decrease the visible time base.

Figure 5B:
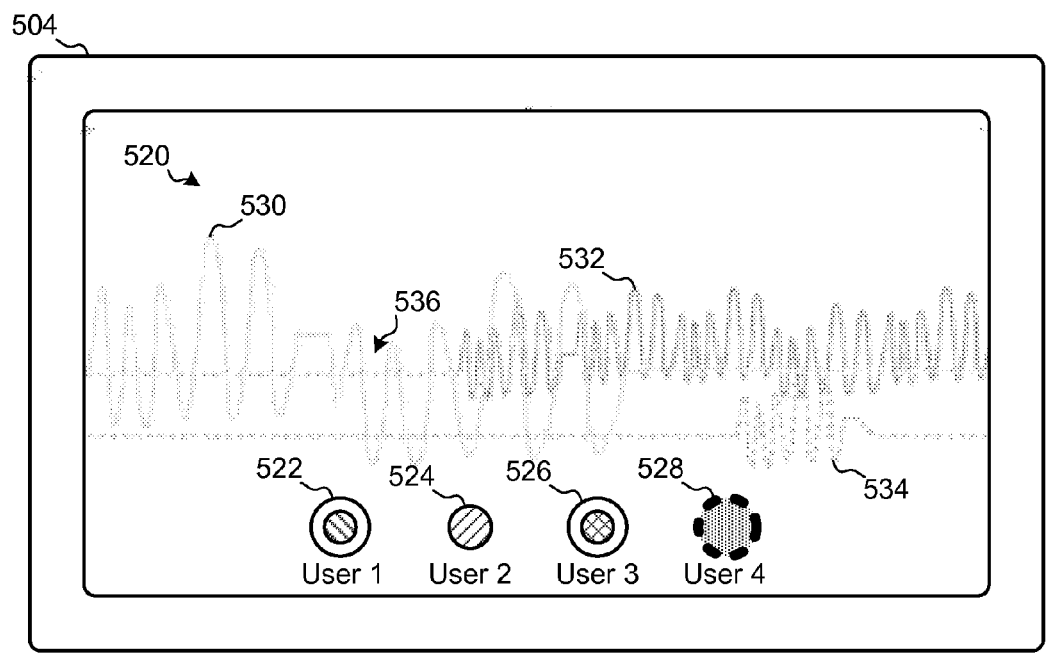

FIG. 5B illustrates another example visualization 520 to display multiple-channel audio. The example visualization 520 of FIG. 5B includes toggles 522-528 and audio tracks 530-534 corresponding to the toggles 522, 526, 528. The example audio track 534 of FIG. 5B, corresponding to the toggle 528, is selected but is illustrated as automatically muted. Automatic muting of a selected audio track 534 may occur when a person associated with the mobile device (e.g., User 4) that recorded the audio track 534 is determined to be inactive during the illustrated time base of the visualization 520. For example, the audio in the audio track 534 may be muted when the volume level of the audio track 534 is below a threshold level for a threshold amount of the illustrated time base. Similarly, the example audio track 532 is automatically muted for a portion 536 of the illustrated time base.

Figure 5C:
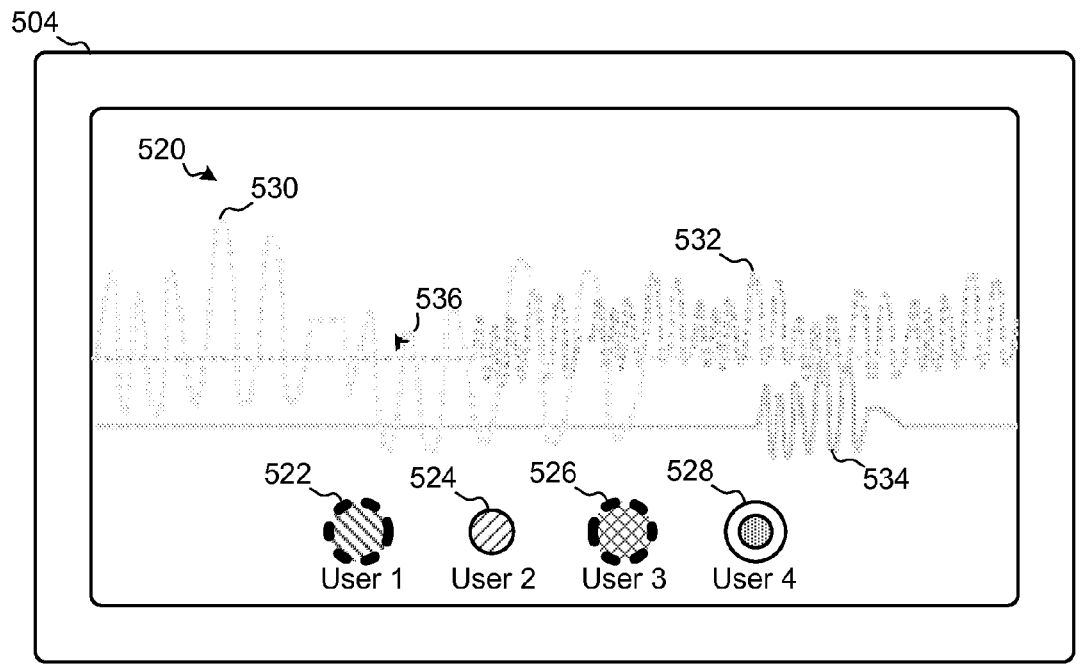

FIG. 5C illustrates the example visualization 520 of FIG. 5B in response to selection of the toggle 528 associated with the automatically-muted audio track 534. In the example of FIG. 5C, the selected audio track 534 is played back while the audio tracks 530, 532 are muted. While the User 4 may be determined to be idle, the mobile device associated with User 4 still records audio, enabling selection of the audio track 534 by a viewer of the visualization 520. In some examples, the audio track 534 is selectable for exclusive listening by a user (e.g., by muting others of the audio tracks 530, 532) when the audio track 534 has not been previously automatically muted.

Figure 5D:
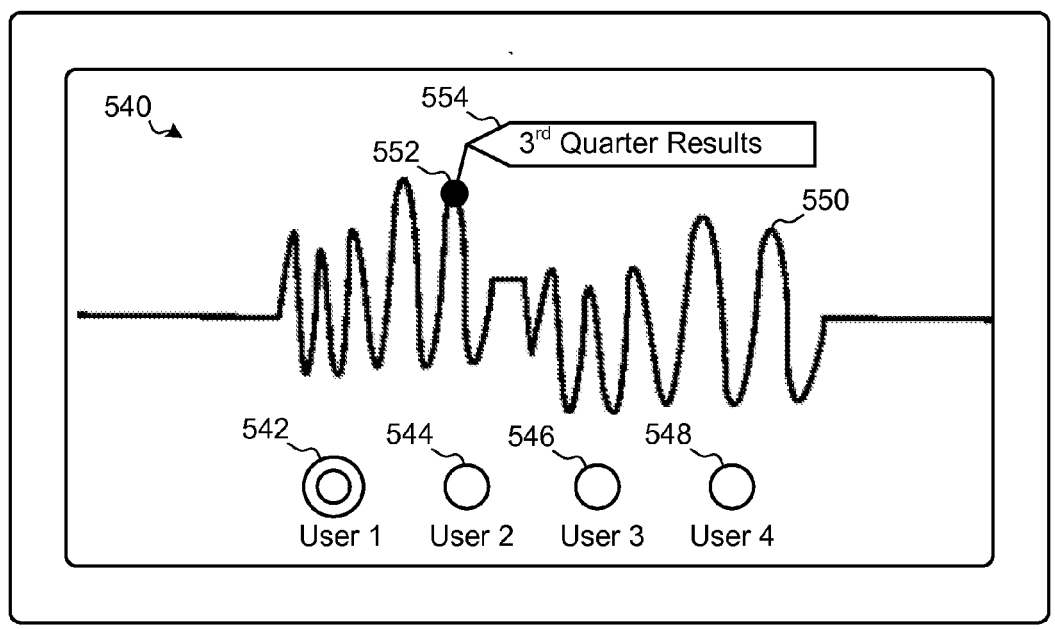

FIG. 5D illustrates another example visualization 540 to display multiple-channel audio. The example visualization 540 of FIG. 5D includes toggles 542-548. A first one of the toggles 542 is selected and corresponds to an audio track 550. The example visualization 540 further includes a marker or annotation 552. The example marker 552 may be automatically generated (e.g., by the event data identifier 312 and/or by the speech recognizer 314 of FIG. 3) or may be generated in response to a user marker or annotation (e.g., via the auxiliary data identifier 310). The marker 552 is shown at a particular time on the audio track 550, but may be shown in alternative ways (e.g., as a vertical line corresponding to the time when multiple audio tracks are selected to be shown in the visualization 540). The example marker 552 includes a descriptor 554. The descriptor may include an annotation or another description of the significance of the marker 552. For example, the descriptor 554 may include a keyword derived from performing speech recognition and keyword recognition. In an example concert event, the marker 552 may indicate the beginning of a song being played and the descriptor 554 may include the name of the song. In some examples, the descriptor 554 is shown and/or hidden in response to a selection of the marker 552.

Figure 5E:
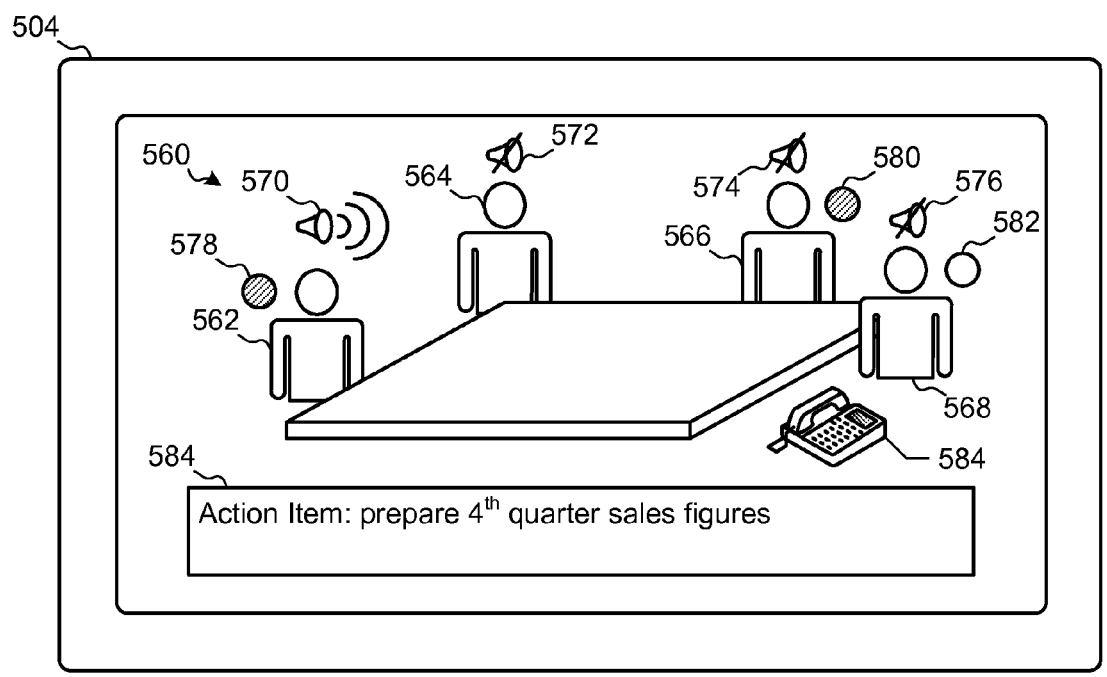

FIG. 5E illustrates another example visualization 560 to display multiple-channel audio. In contrast to the example visualizations 502, 520, 540, 560 of FIGS. 5A-5E, the visualization 560 shows participants 562-568 of an event arranged according to relative positions (e.g., determined by the event server 226 of FIG. 2 based on the recorded audio). Each of the participants 562-568 in the example visualization 560 includes an audio signal indicator 570-576 to indicate whether the respective participant 562-568 is the source of currently-played audio. In the example of FIG. 5E, the audio signal indicator 570 corresponding to the participant 562 indicates that the participant 562 is the source of audio being played (e.g., the participant 562 is speaking). The audio signal indicators 572-576 corresponding to the participants 564-568 indicate that the participants 564-568 are silent. In some examples, the audio signal indicators 570-576 may be selected to mute and/or emphasize particular audio signals and/or audio tracks. For example, a user may select the audio signal indicator 572 to mute the audio signals and/or audio tracks associated with the participant 564.

The example visualization 560 of FIG. 5E further includes auxiliary data indicators 578-582 for the participants 562, 566, 568. The example auxiliary data indicators 578-582 may be selected by a person using the visualization 560 to view the auxiliary data associated with the indicators 578-582. To this end, the example visualization 560 includes an auxiliary data field 584 to display selected auxiliary data. In the example of FIG. 5E, the auxiliary data indicator 582 is selected and auxiliary data in the form of a user note is displayed in the auxiliary data field 584. The example visualization 560 of FIG. 5E further illustrates a remote audio source 586, such as a conference caller, voice over Internet protocol audio caller or source, and/or any other source of audio from a remote participant. In some examples, the remote audio source 586 includes an audio signal indicator and/or an auxiliary data indicator.

The example visualization 560 of FIG. 5E may include additional user interface features such as a timeline control (e.g., to select a particular time in the recording to play back), an auxiliary data search control (e.g., to locate portions of the recording corresponding to keywords), and/or other recording manipulation controls.

Other visualizations may additionally or alternatively be used to express combinations of: the relative and/or absolute locations of participants and/or devices within an event environment, the active speaker(s) at a particular time during an event, the auxiliary data at particular times, and/or any other information associated with the audio recording. In some examples, a viewer of the audio recording visualization may change between different types of visualizations.

While example manners of implementing the mobile device 100 and the event server 226 have been illustrated in FIGS. 1 and 3, one or more of the elements, processes and/or devices illustrated in FIGS. 1 and 3 may be combined, divided, re-arranged, omitted, eliminated and/or implemented in any other way. Further, the example processor 102, the example communication subsystem 104, the example decoder 106, the example RAM 108, the example memory 110, the example keypad 112, the example image sensor 114, the example display 116, the example auxiliary I/O 118, the example data port 120, the example speaker 122, the example microphone 124, the example NFC communications module 126, the example Bluetooth communications module 127, the example subsystems 128, the example motion sensor 129, the example SIM/RUIM 138, the example power source 142, the example operating system 146, the example programs 148, the example network interface 302, the example device registrar 304, the example audio collector 306, the example audio mixer 308, the example audio event identifier 310, the example event data identifier 312, the example speech recognizer 314, the example position determiner 316, the example visualizer 318, the example storage 320 and/or, more generally, the example mobile device 100 of FIG. 1 and/or the example event server 226 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims are read to cover a purely software and/or firmware implementation, at least one of the example processor 102, the example communication subsystem 104, the example decoder 106, the example RAM 108, the example memory 110, the example keypad 112, the example image sensor 114, the example display 116, the example auxiliary I/O 118, the example data port 120, the example speaker 122, the example microphone 124, the example NFC communications module 126, the example Bluetooth communications module 127, the example subsystems 128, the example motion sensor 129, the example SIM/RUIM 138, the example power source 142, the example operating system 146, the example programs 148, the example network interface 302, the example device registrar 304, the example audio collector 306, the example audio mixer 308, the example audio event identifier 310, the example event data identifier 312, the example speech recognizer 314, the example position determiner 316, the example visualizer 318, and/or the example storage 320 are hereby expressly defined to include a non-transitory storage device, such as a memory, DVD, CD, etc. storing the software and/or firmware. Further still, the example mobile device 100 of FIG. 1 and/or the example event server 226 of FIG. 3 may include one or more elements, processes and/or devices in addition to, or instead of, those illustrated in FIGS. 1 and/or 3, and/or may include more than one of any or all of the illustrated elements, processes and devices.

Flowcharts representative of example processes that may be carried out using machine readable instructions for implementing the mobile device 100 of FIG. 1 and/or the event server 226 are shown in FIGS. 6-9. In these examples, the machine readable instructions comprise program(s) for execution by a processor such as the processor 102 shown in the example mobile device 100 discussed above in connection with FIG. 1 and/or the processor 1012 shown in the example processing platform 1000 discussed below in connection with FIG. 10. The program(s) may be embodied in software stored on a non-transitory, a storage device, such as the memories 108, 110, 1013, 1014, 1016 associated with the processors 102 and 1012, but the entireties of the program(s) and/or parts thereof could alternatively be executed by a device other than the processors 102 and 1012 and/or embodied in firmware or dedicated hardware. Further, although the example program(s) are described with reference to the flowcharts illustrated in FIGS. 6-9, many other methods of implementing the mobile device 100 and/or the event server 226 may alternatively be used. For example, the order of execution of the blocks may be changed, and/or some of the blocks described may be changed, eliminated, or combined.

As mentioned above, the example processes of FIGS. 6-9 may be implemented using coded instructions (e.g., computer readable instructions) stored on a non-transitory storage device, such as a hard disk drive, a flash memory, a read-only memory (ROM), a cache, a RAM and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 6-9 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Figure 6:
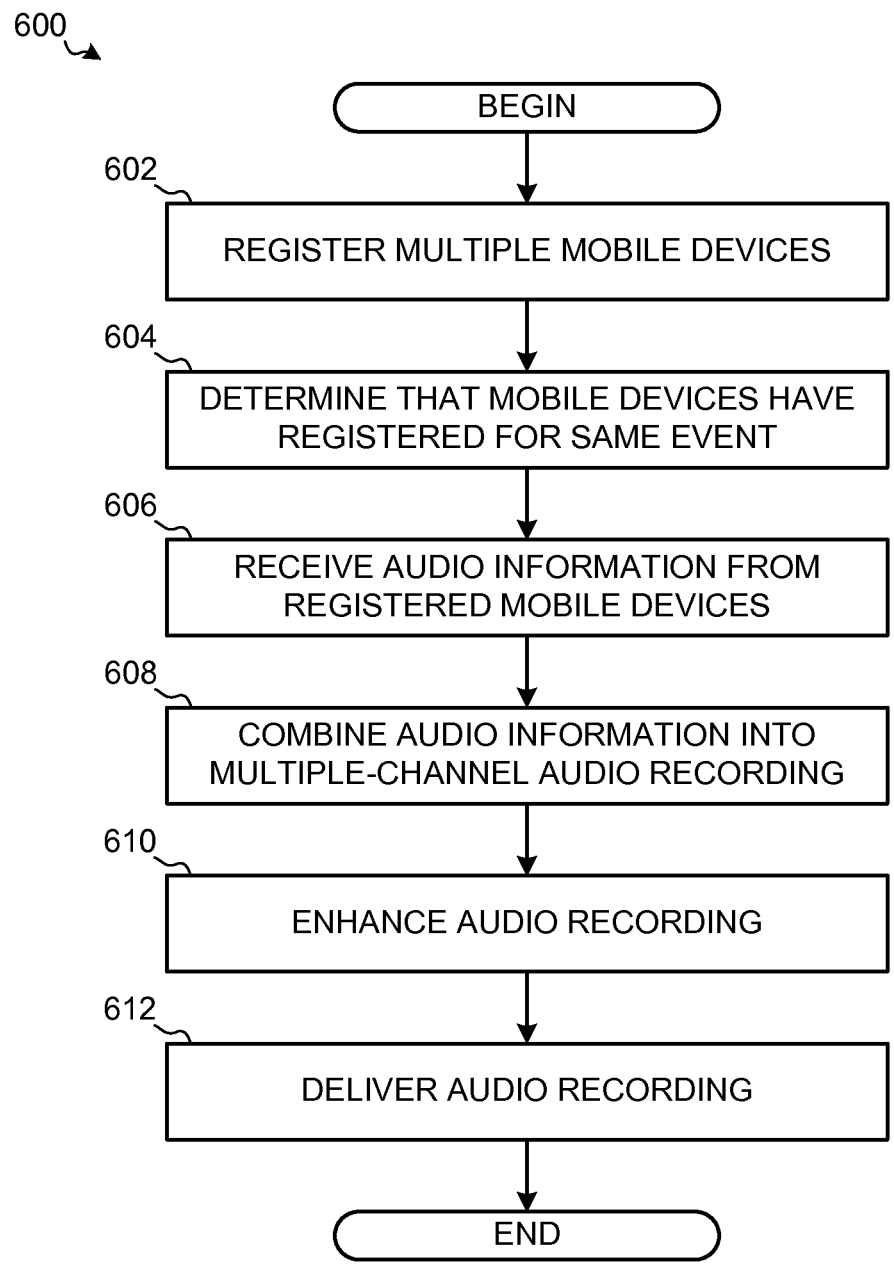
FIG. 6 is a flowchart representative of an example method that may be carried out by a machine executing machine readable instructions to record multiple-channel audio for an event using multiple mobile devices.

FIG. 6 is a flowchart representative of an example method 600 to generate a multiple-channel audio recording for an event using multiple mobile devices. The example method 600 of FIG. 6 may be performed by the example event server 226 of FIGS. 2 and/or 3 to implement the environment 200 of FIG. 2.

The example event server 226 registers multiple mobile devices (e.g., the mobile devices 202-210 of FIG. 2) (block 602). For example the device registrar 304 of FIG. 3 may receive registration information from the devices 202-210 and register the devices 202-210 for the event. The example device registrar 304 determines that the mobile devices 202-210 have registered for the same event (e.g., for an event at a same physical event location) (block 604). The example event server 226 receives (e.g., via the audio collector 306 and the network interface 302) audio information from the registered mobile devices 202-210 (block 606).

The example audio mixer 308 combines audio information into a multiple-channel audio recording (block 608). The multiple-channel audio recording may be generated as the event server 226 receives the audio and/or at the conclusion of the event. The example event server 226 enhances the multiple-channel audio recording (block 610). Enhancing the audio recording may include, for example, generating a visualization, converting speech in the recording to text, including markers such as keywords in the audio recording, and/or any other enhancements to the audio recording. The example event server 226 distributes the recording (block 612). The event server 226 may distribute the recording to the mobile devices 202-210 and/or to any other computing device. In some examples, the event server 226 only distributes the recording to authorized devices (e.g., devices that participated in the event). In some such examples, the event server 226 only distributes the recording to devices that request the recording. After distributing the recording, the example method 600 ends. However, the example method 600 may iterate for additional events.

Figure 7:
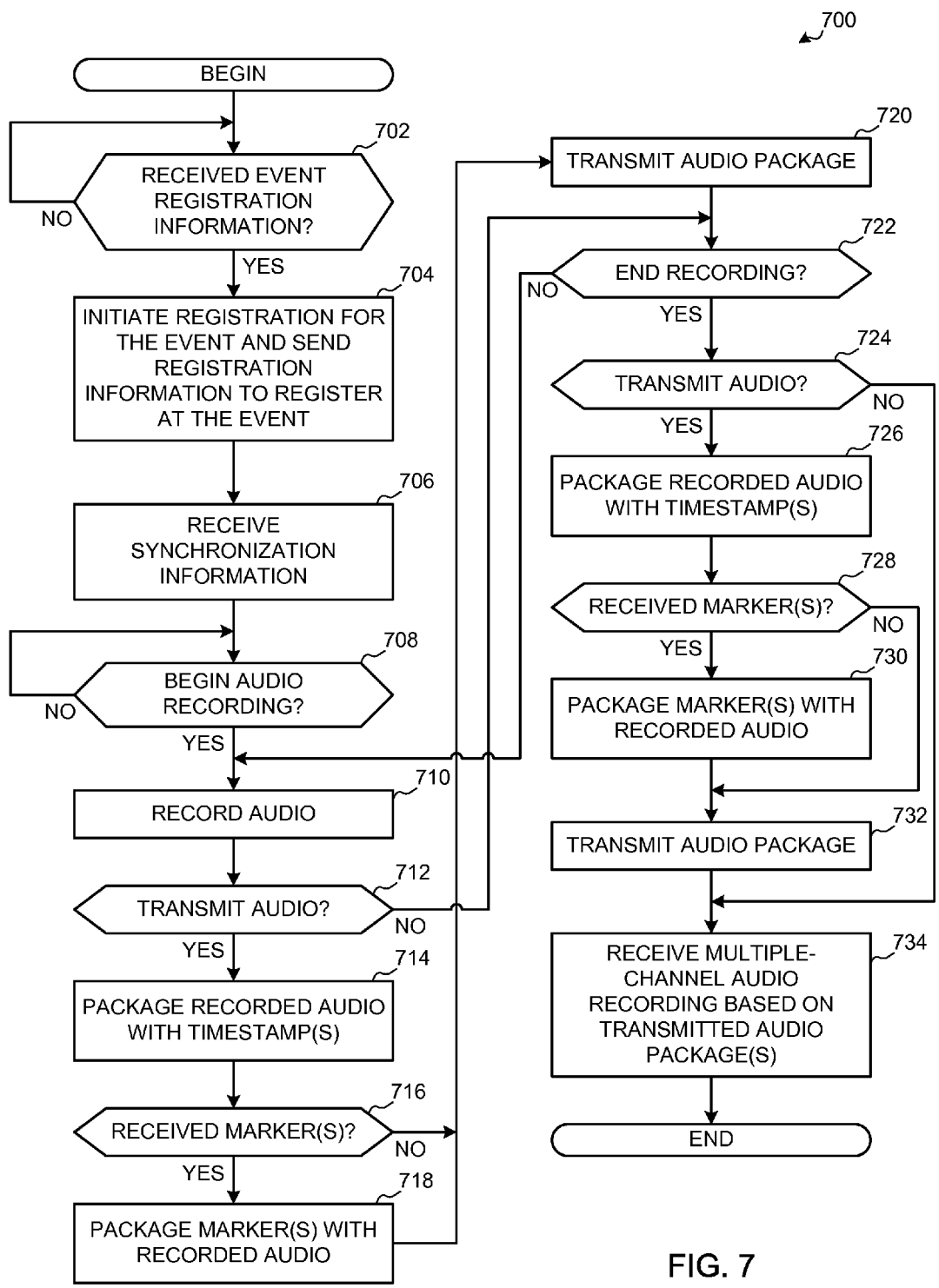
FIG. 7 is a flowchart representative of an example method that may be carried out by a machine executing machine readable instructions to record audio for an event.

FIG. 7 is a flowchart representative of an example method 700 that may be performed by a mobile device (e.g., the mobile devices 100, 202-210 of FIGS. 1 and/or 2) to record audio for an event. The example method 700 of FIG. 7 may be performed by, for example, the mobile device 100 and/or the mobile devices 202-210 of FIGS. 1 and/or 2.

The example method 700 begins by determining (e.g., via the processor 102 of FIG. 1) whether event registration information (e.g., for an event at a physical event location)

has been received (block 702). Event registration information may be received via any of the example keypad 112, the example image sensor 114, the example auxiliary I/O 118, the example data port 120, the example microphone 124, the example touch-sensitive interface 132, and/or any other input interface present in the mobile device 100. If event registration information is not received (block 702), control loops to block 702 to await the event registration information. When event registration information is received (block 702), the example mobile device 100 initiates registration for the event and sends registration information to register at the event (block 704). Initiating the registration may include, for example, determining an address or location of a registrar for the event. The registrar may be a server (e.g., the event server 226), another mobile device 202-210 participating in the event, and/or any other computing device. Sending the registration information may include providing an identifier of the mobile device 100 and/or an identifier of a user of the mobile device 100. In some examples, the registration information includes sending details about the event, such as a location, a description, anticipated attendees, and/or any other event information.

The example mobile device 100 receives synchronization information (block 706). The synchronization information enables the mobile device 100 to provide a time stamp for recorded audio, which enables an event server 226 to correlate and align the multiple channels of audio received from multiple devices 202-210. The example mobile device 100 determines whether the audio recording is to begin (block 708). For example, the processor 102 may receive a start recording signal or may determine that a start time of the event has occurred. If the audio recording has not begun (block 708), the mobile device 100 waits at block 708 for the audio recording to begin.

When the audio recording begins (block 708), the example mobile device 100 records audio of the event (e.g., via the microphone 158) (block 710). The example mobile device 100 determines whether to transmit the audio (e.g., to the event server 226) (block 712). In some examples, the mobile device 100 is to transmit audio in blocks during the event. In some other examples, the mobile device 100 is to transmit the audio at the conclusion of the event.

If the mobile device 100 is to transmit the audio (block 712), the example mobile device 100 packages the recorded audio with one or more timestamp(s) (block 714). For example, a number of timestamps included may be based on a length of the recorded audio to be transmitted. The example mobile device 100 determines whether any markers have been received (block 716). Markers may be received from, for example, from a user via one or more input devices (e.g., the keypad 112, the touch-sensitive interface 132 of FIG. 1). Example markers include images and/or other annotations. If any markers are received (block 716), the example mobile device 100 packages the marker(s) with the recorded audio (block 718). The example mobile device 100 may also assign timestamps to the markers so that the markers may be accurately placed in a resulting multiple-channel audio recording.

After packaging the markers (block 718) or if no markers have been received (block 716), the example processor transmits the audio package (e.g., via the communication subsystem 104, the NFC communications module 126, the Bluetooth communications module 127, and/or any other communications subsystem) (block 720). After transmitting the audio package (block 720), or if audio is not to be transmitted (block 712), the example mobile device 100 determines whether to end recording (block 722). For example, the mobile device 100 may end recording when the event is scheduled to end, based on a command from the event server 226 to stop recording, and/or if the mobile device 100 leaves the event. If recording is not ending (block 722), control returns to block 710 to continue recording audio.

When the recording is to end (block 722), the example mobile device 100 determines whether to transmit the audio (block 724). If the mobile device 100 is to transmit the audio (block 724), the example mobile device packages the recorded audio with one or more timestamp(s) (block 726). For example, a number of timestamps included may be based on a length of the recorded audio to be transmitted. The example mobile device 100 determines whether any markers have been received (block 728). If any markers are received (block 728), the example mobile device 100 packages the marker(s) with the recorded audio (block 730). The example mobile device 100 may also assign timestamps to the markers so that the markers may be accurately placed in a resulting multiple-channel audio recording.

After packaging the markers (block 730) or if no markers have been received (block 728), the example processor transmits the audio package (block 732). At some time after transmitting the audio package (block 732) or after determining that the mobile device 100 is to not transmit audio (block 724), the example mobile device 734 receives a multiple-channel audio recording based on the transmitted audio packages (block 734). For example, the multiple-channel audio recording may be generated by combining and correlating the audio transmitted in blocks 720 and/or 732 with audio recorded by other mobile devices at the event. After receiving the multiple-channel audio recording (block 734), the example method 700 may end. In some examples, the mobile device 100 iterates the method 700 for a subsequent event.

Figure 8:
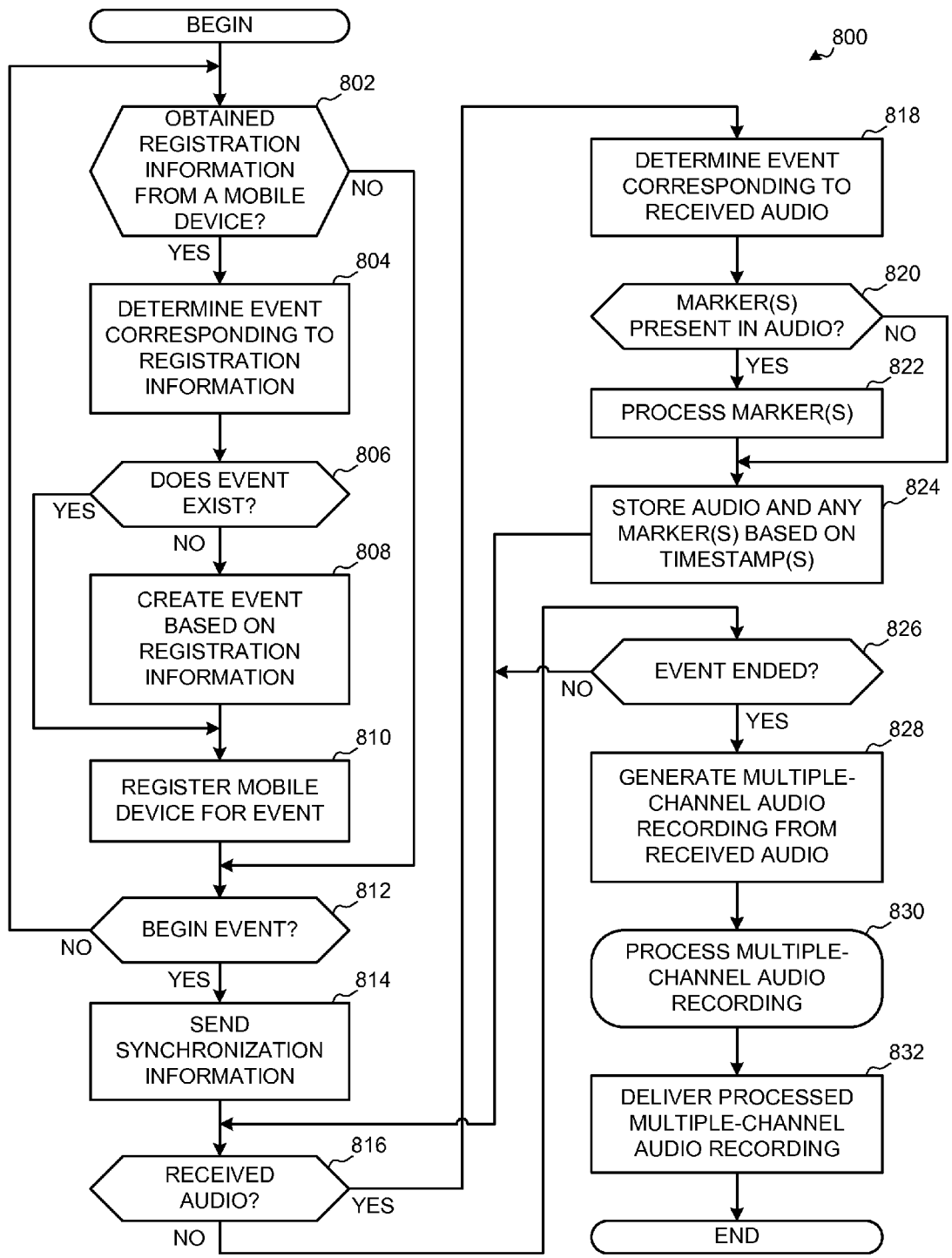
FIG. 8 is a flowchart representative of an example method that may be carried out by a machine executing machine readable instructions to obtain audio for an event from multiple mobile devices and to generate a multiple-channel audio recording from the audio.

FIG. 8 is a flowchart representative of an example method 800 that may be performed by a computing device to obtain audio for an event from multiple mobile devices and to generate a multiple-channel audio recording from the audio. The example method 800 may be performed by any of the example mobile devices 100, the example event server 226, and/or the example processing platform 1000 of FIGS. 1, 2, 3, and/or 10. The method 800 will be described below with reference to the example event server 226 of FIGS. 2 and 3.

The example method 800 begins by determining (e.g., via the device registrar 304 of FIG. 3) whether registration information has been obtained from a mobile device (e.g., the mobile device 202 of FIG. 2) (block 802). If registration information has been obtained (e.g., received, accessed) (block 802), the example device registrar 304 determines an event corresponding to the registration information (block 804). The device registrar 304 may determine the event by comparing the registration information and/or contextual information (e.g., time) to known events. The device registrar 304 determines whether an event exists for which the mobile device 202 is to be registered (block 806).

If the event does not exist (block 806), the example device registrar 304 creates an event based on the registration information (block 808). The event may be based on event information included in the registration information and/or based on contextual information. After creating the event (block 808), or if the event existed (block 806), the example device registrar 304 registers the mobile device for the event (block 810). The example device registrar 304 and/or the audio collector 306 determine whether the event is to begin (block 812). If the event has not begun (or is not to begin) (block 812), control returns to block 802 to determine whether registration information has been received from additional mobile device(s) 202-210. In some examples, the device registrar 304 prevents events from beginning until at least two mobile devices 202-210 have been registered for the event.

If the event is to begin (block 812), the example audio collector 306 sends synchronization information to the registered mobile devices (block 814). The synchronization information is used by the registered mobile devices 202-210 to timestamp audio sent to the event server 226. The timestamps are then used to correlate the received audio. The example audio collector 306 determines whether audio has been received (block 816). For example, the audio collector 306 may receive audio from one or more of the registered mobile devices 202-210 during and/or after the event.

When audio is received (block 816), the example audio collector 306 determines the event corresponding to the audio (block 818). For example, if the event server 226 is collecting audio for multiple events simultaneously, the audio collector 306 monitors received audio for an identifier of the event for which the received audio was recorded. The example audio collector 306 determines whether any marker(s) are present in the audio (block 820). If marker(s) are present (block 820), the example audio collector 306 processes the marker(s) (block 822). Processing the markers may include determining a type of a marker and a timestamp of the marker. After processing the marker(s) (block 822) or if no markers are present in the audio (block 820), the example audio collector 306 stores the received audio and any marker(s) based on the timestamp(s) (block 824). Control then returns to block 816 to continue recording audio.

If audio has not been received (block 816), the example audio collector 306 determines whether the event has ended (block 826). If the event has not ended, control returns to block 816 to continue receiving audio. When audio has not been received (block 816) and the event has ended (block 826), the example audio mixer 308 generates a multiple channel audio recording from the received audio (block 828). For example, the audio mixer 308 may correlate the received timestamps to align the audio received from the multiple mobile devices 202-210 while keeping the channels separate. The example event server 226 processes (e.g., enhances) the multiple-channel audio recording (block 830). For example, the example speech recognizers 314, the example position determiner 316, the example visualizer 318, and/or any other audio or metadata processor may be used to enhance the audio with auxiliary information. The auxiliary information may be encoded or included as auxiliary information in the multiple-channel audio recording. An example method to implement block 830 is described below with reference to FIG. 9.

The example audio mixer 308 delivers the processed multiple-channel audio recording (block 832). For example, the audio mixer 308 may provide the audio recording to the mobile devices 202-210 participating in the event, or a subset of those devices such as devices that request the audio recording. In some examples, the audio mixer 308 provides the multiple-channel audio recording to requesting devices. The audio mixer 308 may additionally or alternatively provide the multiple-channel audio recording to a storage device for subsequent access.

The example method 800 may then end. In some examples, the event server 226 iterates the method 800 for additional events. While the example method 800 describes combining, processing, and delivering the multiple-channel audio recording (blocks 828-832) after the event has ended, in other example methods the combining, processing, and delivering the multiple-channel audio recording (blocks 828-832) are additionally or alternatively performed before the event is ended (e.g., performed when the audio is received).

Figure 9:
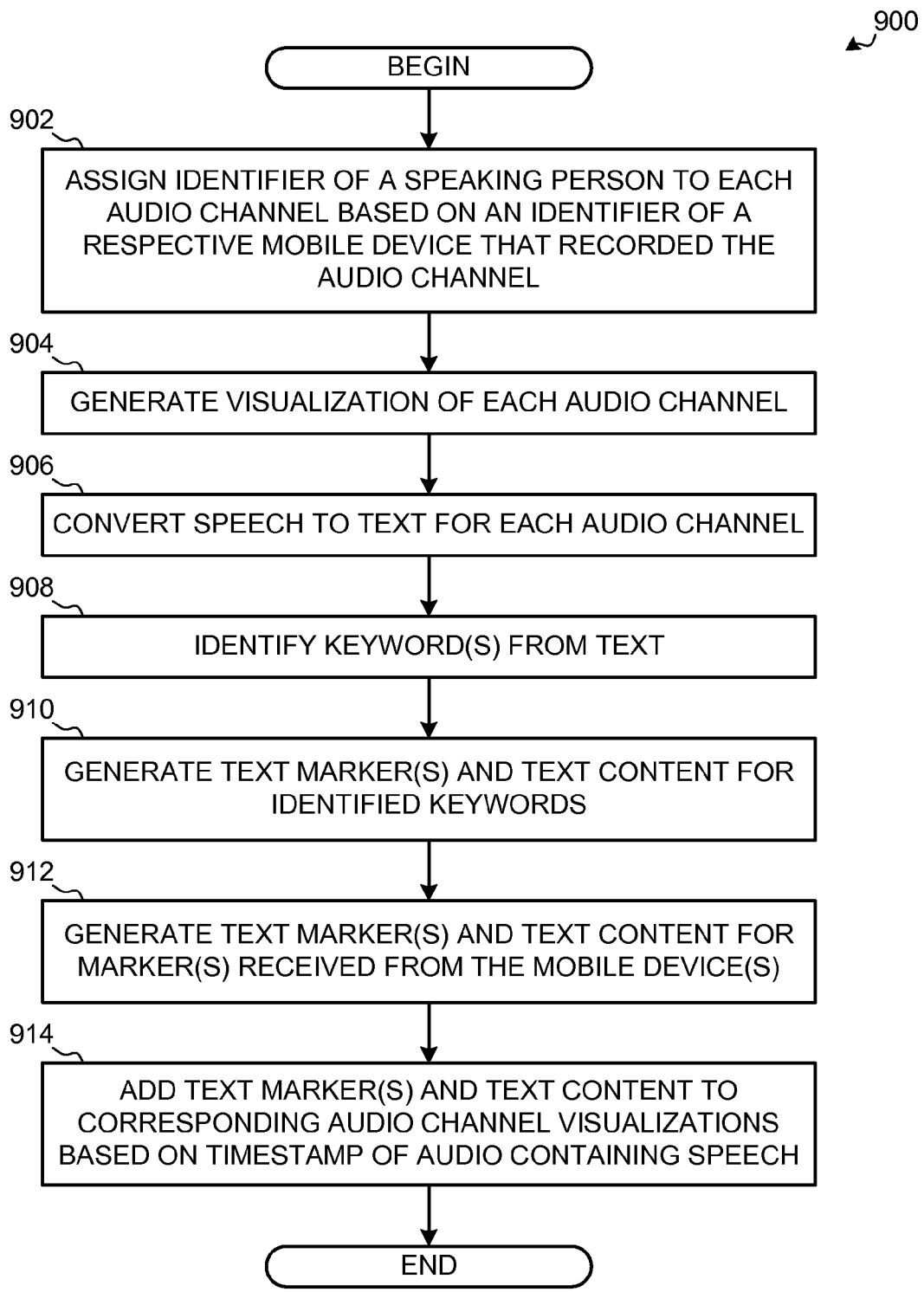
FIG. 9 is a flowchart representative of an example method that may be carried out by a machine executing machine readable instructions to process a multiple-channel audio recording.

FIG. 9 is a flowchart representative of an example method 900 to process multiple-channel audio recorded using multiple mobile devices. The example method 900 may be performed by the event server 226 of FIGS. 2 and 3 to implement block 830 of FIG. 8.

The example method 900 begins when a multiple-channel audio recording is generated (e.g., by the audio mixer 308 of FIG. 3). The example audio mixer 308 assigns an identifier 902 of a speaking person to each audio channel in the multiple-channel audio recording based on an identifier of a respective mobile device that recorded the audio channel (block 902). The identifier may identify the mobile device and/or a user of the mobile device, and is used to identify each audio channel for further processing and/or display.

The example visualizer 318 of FIG. 3 generates a visualization of each audio channel (block 904). Example visualizations are described above with reference to FIGS. 5A-5E. The example speech recognizer 314 converts speech to corresponding text for each audio channel (block 906). In some examples, the speech conversion includes detecting inflection or other voice qualities to infer information about the speech (e.g., whether the speech is a statement or a question).

The example event data identifier 312 identifies keyword(s) from the text (block 908). For example, keywords may be determined from a pre-defined list of words, from repeated words, and/or using any other criteria to detect keywords. From the identified keywords, the example event data identifier 312 generates text marker(s) and text content (block 910). The example auxiliary data identifier 310 generates text marker(s) and text content for marker(s) received from the mobile devices 202-210 (block 912).

The example audio mixer 308 adds the text marker(s) and the text content to the corresponding audio channel visualizations based on the timestamps of the audio that contains the speech (block 914). The example method 900 ends.

Figure 10:
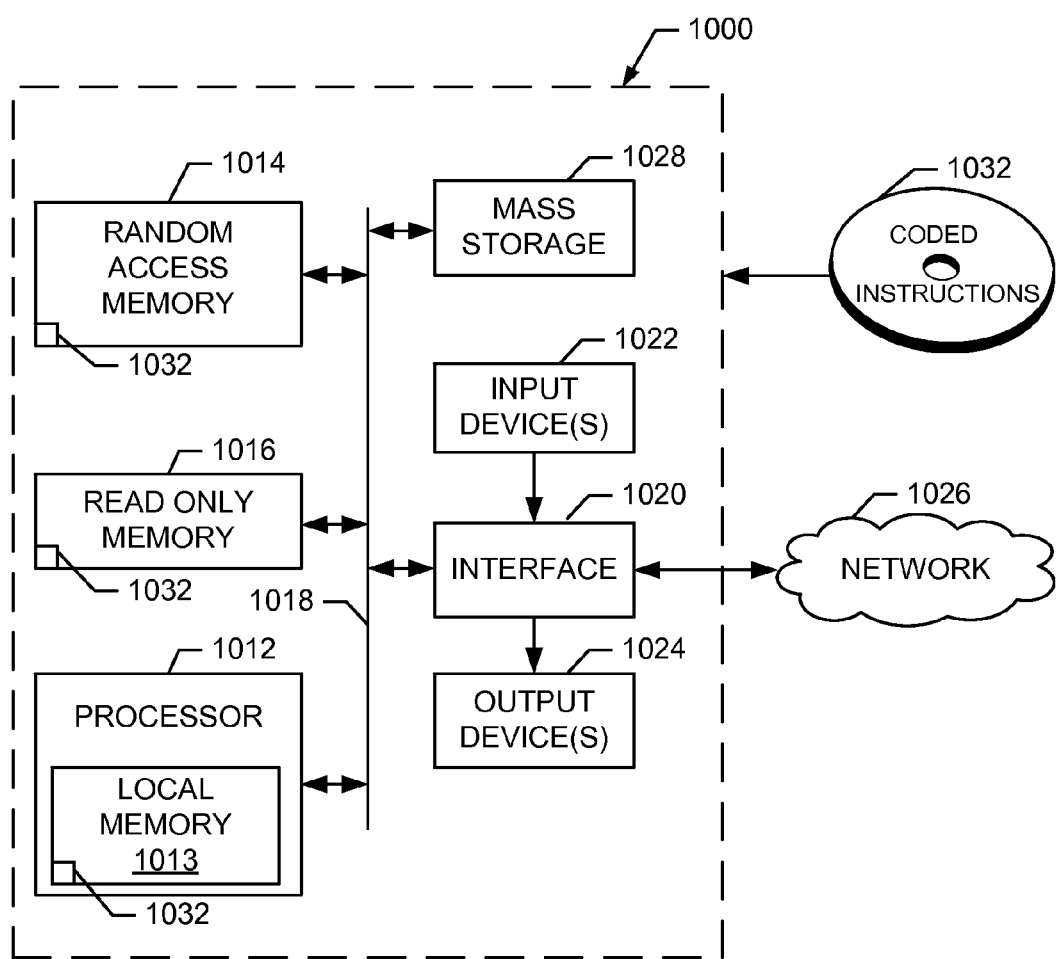
FIG. 10 is a block diagram of an example processing platform capable of executing the instructions of FIGS. 6-9 to implement the devices of FIGS. 1 and/or 3.

FIG. 10 is a block diagram of an example processing platform capable of executing the instructions of FIGS. 6-9 to implement the devices and/or servers of FIGS. 1 and/or 3. The processing platform 1000 can be, for example, a server, a personal computer, a mobile phone (e.g., a cell phone), a personal digital assistant (PDA), or any other type of computing device.

The system 1000 of the instant example includes a processor 1012. For example, the processor 1012 can be implemented by one or more microprocessors or controllers from any desired family or manufacturer.

The processor 1012 includes a local memory 1013 (e.g., a cache) and is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processing platform 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, may include a graphics driver card.

The interface circuit 1020 also includes a communication device (e.g., the network interface 302 of FIG. 3) such as a modem or network interface card to facilitate exchange of data with external computers via a network 1026 (e.g., an Ethernet connection, a digital subscriber line (DSL), a telephone line, coaxial cable, a cellular telephone system, etc.).

The processing platform 1000 also includes one or more mass storage devices 1028 for storing software and data. Examples of such mass storage devices 1028 include floppy disk drives, hard drive disks, compact disk drives and digital versatile disk (DVD) drives.

The coded instructions 1032 of FIGS. 6-9 may be stored in the mass storage device 1028, in the volatile memory 1014, in the non-volatile memory 1016, and/or on a removable storage medium such as a CD or DVD.

Example methods and devices disclosed herein enable users of mobile devices to cooperate to generate a multiple-channel recording of an event. Example methods and devices provide flexibility and scalability by permitting any number of devices to join in the recording and/or by enabling devices that have not been previously associated to contribute to a common multiple-channel audio recording. Additionally, example methods and devices disclosed herein provide enhancements to multiple-channel audio recordings to increase the ability of a user of a recording to obtain information.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method of recording audio for an event, comprising:
    initiating a registration of a first device in response to determining that the first device is in a physical location of the event;
    sending first registration information associated with the first device to a server to register the first device for the event;
    receiving first synchronization information from the server in response to the first registration information;
    recording first audio associated with the event via the first device, wherein the recorded first audio is associated with a first set of timestamps based on the first synchronization information;
    sending the first audio to the server, wherein the server combines the first audio with second audio associated with the event, the second audio recorded via a second device different than the first device, the second audio sent to the server by the second device, wherein the second device receives second synchronization information from the server, the second device associates the second audio with a second set of timestamps based on the second synchronization information, and wherein the server combining the first audio with the second audio includes synchronizing the first audio with the second audio based on the first set of timestamps associated with the first audio and the second set of timestamps associated with the second audio;
    receiving the combined audio from the server after completing the recording, wherein the combined audio comprises a multiple-channel audio recording including the first audio and the second audio being on separate audio channels; and
    suppressing an audio channel of the first audio or the second audio in the multiple-channel audio recording during playback of the received combined audio, wherein during the playback a different audio channel of the first audio and the second audio that is not suppressed is played.

2. A method as defined in claim 1, wherein initiating the registration at the first device comprises at least one of scanning an image with an image sensor, identifying the event based on a schedule, executing a close-proximity communications transaction, executing a wireless communications transaction, detecting motion of the first device, detecting a physical location of the first device via a location module of the first device, detecting a physical location of the first device using an image sensor external to the first device, detecting a physical location of the first device using an audio sensor external to the first device, forming an ad hoc wireless network, transmitting an audio signal, or receiving an indication of registration via a user interface.

3. A method as defined in claim 1, further comprising sending at least one of an identification of the first device or an identification of a user associated with the first device.

4. A method as defined in claim 1, wherein sending the first audio is performed in real-time.

5. A method as defined in claim 1, wherein sending the first audio is performed when the event has finished.

6. A mobile device, comprising:
    a processor;
    an audio recording device that records first audio of an event; and
    a memory storing instructions which, when executed by the processor, cause the processor to:
        initiate a registration of the mobile device in response to determining that the mobile device is in a physical location of the event;
        send registration information associated with the mobile device to a server to register the mobile device for the event;
        receive first synchronization information from the server in response to the registration information;
        associate the first audio with a first set of timestamps based on the first synchronization information;
        send the first audio to the server, wherein the server combines the first audio with second audio of the event, the second audio recorded via a different device than the mobile device, the second audio sent to the server by the different device, wherein the different device receives second synchronization information from the server, the different device associates the second audio with a second set of timestamps based on the second synchronization information, and wherein the server combining the first audio with the second audio includes synchronizing the first audio with the second audio based on the first set of timestamps associated with the first audio and the second set of timestamps associated with the second audio;

receive the combined audio from the server after completing the recording, wherein the combined audio comprises a multiple-channel audio recording including the first audio and the second audio being on separate audio channels; and suppress an audio channel of the first audio or the second audio in the multiple-channel audio recording during playback of the received combined audio, wherein during the playback a different audio channel of the first audio and the second audio that is not suppressed is played.

7. A mobile device as defined in claim 6, further comprising an image sensor, the instructions further causing the processor to initiate the registration in response to scanning an image with the image sensor.

8. A mobile device as defined in claim 6, further comprising a close-proximity communications subsystem, the instructions further causing the processor to initiate the registration in response to executing a close-proximity communications transaction with the close-proximity communications subsystem.

9. A mobile device as defined in claim 6, wherein the instructions further cause the processor to initiate the registration in response to at least one of identifying the event based on a schedule, identifying a location of the mobile device, or forming an ad hoc wireless network.

10. A mobile device as defined in claim 6, wherein the registration information comprises at least one of an identification of the mobile device or an identification of a person associated with the mobile device.

11. A mobile device as defined in claim 6, wherein the instructions further cause the processor to send information to describe the event.

12. A method of recoding audio, comprising:
receiving registrations from a plurality of devices located at a physical event location;
determining that the registrations correspond to a same event at the event location;
sending synchronization information to each of the plurality of devices in response to a corresponding registration from each of the plurality of devices;
receiving a plurality of audio channels from the plurality of devices, each of the plurality of audio channels representing audio recorded at one of the plurality of devices, each of the plurality of audio channels associated with a set of timestamps based on corresponding synchronization information received from the server;
combining the plurality of audio channels to form a combined audio recording, wherein the combined audio recording comprises a multiple-channel audio recording including the plurality of audio channels with each audio channel being a separate audio channel within the multiple-channel audio recording, and wherein combining the plurality of audio channels is performed after the plurality of devices have completed recording, combining the plurality of audio channels including synchronizing the plurality of audio channels based on the corresponding set of timestamps associated with each of the plurality of audio channels; and
sending the combined audio recording to at least one of the plurality of devices, wherein the at least one of the plurality of devices suppresses at least one of the plurality of audio channels in the multiple-channel audio recording during playback of the combined audio recording, wherein during the playback remaining of the plurality of audio channels that are not suppressed are played.

13. A method as defined in claim 12, wherein each of the registrations comprises a same event identifier.

14. A method as defined in claim 12, further comprising assigning an identifier of a speaking person to an audio channel based on an identifier of a respective one of the devices that recorded the audio channel.

15. A method as defined in claim 14, wherein a registration corresponding to the one of the devices includes at least one of an identifier of the device or an identifier of the speaking person.

16. A method as defined in claim 12, further comprising distributing the combined audio recording to at least one of the plurality of devices.

17. A method as defined in claim 16, further comprising enhancing the combined audio recording to include auxiliary data representative of audio in the audio recording.

\* \* \* \* \*